United States Patent [19]
Hahn et al.

[11] Patent Number: 5,789,638
[45] Date of Patent: Aug. 4, 1998

[54] HYDROGENATION OF UNSATURATED POLYMERS USING MONOCYCLOPENTADIENYL GROUP IV METAL CATALYSTS

[75] Inventors: Stephen F. Hahn, Sanford; David R. Wilson, Midland, both of Mich.

[73] Assignee: The Dow Chemical Company, Midland, Mich.

[21] Appl. No.: 712,660

[22] Filed: Sep. 13, 1996

Related U.S. Application Data

[63] Continuation of Ser. No. 353,872, Dec. 12, 1994, abandoned.

[51] Int. Cl.$^6$ .............................. C07C 5/02; C07C 5/03
[52] U.S. Cl. .............................................................. 585/275
[58] Field of Search ..................................... 585/275

[56] References Cited

U.S. PATENT DOCUMENTS

| | | |
|---|---|---|
| 3,161,629 | 12/1964 | Gorsich . |
| 3,306,919 | 2/1967 | Brantley et al. . |
| 3,920,745 | 11/1975 | Floriani et al. . |
| 4,501,857 | 2/1985 | Kishimoto et al. . |
| 4,668,773 | 5/1987 | Marks et al. . |
| 4,673,714 | 6/1987 | Kishimoto et al. . |
| 4,716,257 | 12/1987 | Marks et al. . |
| 4,801,666 | 1/1989 | Marks et al. . |
| 4,929,699 | 5/1990 | Wilson et al. . |
| 4,980,421 | 12/1990 | Teramoto et al. . |
| 5,017,660 | 5/1991 | Hattori et al. . |
| 5,039,755 | 8/1991 | Chamberlain et al. . |
| 5,141,997 | 8/1992 | Chamberlain et al. . |
| 5,177,155 | 1/1993 | Chamberlain et al. . |
| 5,206,307 | 4/1993 | Chamberlain et al. . |

FOREIGN PATENT DOCUMENTS

| | | | |
|---|---|---|---|
| 0339986 | 11/1989 | European Pat. Off. . | |
| 0416815 | 3/1991 | European Pat. Off. . | |
| 0418044 | 3/1991 | European Pat. Off. . | |
| 0434469 | 6/1991 | European Pat. Off. . | |
| 0471415 | 2/1992 | European Pat. Off. . | |
| 545844 | 6/1993 | European Pat. Off. ............... | 585/275 |
| 3448317 | 8/1984 | Germany . | |

OTHER PUBLICATIONS

Melendez et al., "Pentadienyl, a More Reactive and More Strongly Bound Ligand Than Cyclopentadienyl", *Angew. Chem. Int. Ed. Engl.*, 27(1988) No. 8, pp. 1099–1101, No Month Available.

Stahl et al., "Pentadienyl Compounds of Zirconium, Niobium and Molybdenum: 'U' vs. 'S' $\eta^5$–2,4–Dimethylpentadienyl Coordination", *J. Am. Chem. Soc.*, 1985, 107, pp. 5016–5018, No Month Available.

Cuenca et al. "Dicyclopentadienyl–titanium and –zirconium complexes as catalysts for hydrogenation of olefins", *J. Organo. Chem.*, 462 (1993), pp. 191–201, No Month Available.

Liu et al., "Bis(2,4–dimethylpentadienyl)titanium: An 'Open Titanocene'", *J. Am. Chem. Soc.*, (1982), 104, pp. 3737–3739, No Month Available.

Freeman et al., "Ethylene Polymerization Over Organochromium Catalysts", *J. of Poly. Sci.*, 25 (1987), pp. 2063–2075, No Month Available.

Wilson et al., "Pentadienyl Compounds of Vanadium, Chromium, and Manganese", *J. Am. Chem. Soc.*, (1982), 104, pp. 1120–1122, No Month Available.

Ernst, "Metal–Pentadienyl Chemistry", *Accounts of Chemical Research*, 1985, 18, pp. 56–62, No Month Available.

Ernst, "Structural and Reactivity Patterns in Transition–Metal–Pentadienyl Chemistry", *Chem. Rev.* (1988), 88, pp. 1255–1291, No Month Available.

Waldman et al., "Half–Open–Titanocene Chemistry: Coupling Reactions of Pentadienyl Ligands with C–N and C–O Multiple Bonds", *Organometallics*, (1992), 11, pp. 3201–3209, No Month Available.

Newbound et al., "Structural and Reaction Chemistry of the Open Chromocene Bis(2,4–dimethylpentadienyl)chromium", *Organometallics*, (1987), 6, pp. 2432–2437, No Month Available.

Newbound et al., "Open and Half–Open Ruthenocenes and Osmocenes", *Organometallics*, (1990), 9, pp. 2962–2972, No Month Available.

Gleiter et al., "Half–Open Metallocenes of Iron, Ruthenium and Osmium", *Organometallics*, (1989), 8, pp. 298–306, No Month Available.

Poli, "Monocyclopentadienyl Halide Complexes of the d– and f– Block Elements", *Chem. Rev.*, 91, (1991), pp. 509–551, No Month Available.

Suzuki et al., "Preparation and some Properties of Triorganosiloxy Derivatives of Cyclopentadienyl Titanium", *Bull. Chem. Soc. Japan*, vol. 48(9), (1975), pp. 2460–2461, No Month Available.

Nesmeyanov et al., "Mono(cyclopentadienyl)alkoxytitanium halides" *Bull. Chem. Soc. USSR*, No. 3, pp. 527–534 (pp. 514–520 translation), Mar. 1968.

*Primary Examiner*—Elizabeth D. Wood
*Attorney, Agent, or Firm*—Gary C. Cohn

[57] ABSTRACT

Organic compounds are hydrogenated in the presence of certain monocyclopentadienyl Group IV metal compounds. These titanium compounds are effective hydrogenation catalysts for polymers containing ethylenic unsaturation. They further provide for selective hydrogenation of ethylenic unsaturation sites in the presence of aromatic groups.

10 Claims, No Drawings

HYDROGENATION OF UNSATURATED POLYMERS USING MONOCYCLOPENTADIENYL GROUP IV METAL CATALYSTS

CROSS-REFERENCE TO RELATED APPLICATION.

This is a continuation of application Ser. No. 08/353,872 filed Dec. 12, 1994 and now abandoned.

BACKGROUND OF THE INVENTION

This invention relates to a process for hydrogenating olefinically unsaturated polymers.

Various types of organic polymers contain olefinic unsaturation, i.e., unsaturation of the type —R'C=CR'— or —R'C=CR'$_2$, wherein R' is hydrogen or an organic radical. The most notable of these are polymers of conjugated dienes such as poly(butadiene), which contain olefinic unsaturation sites either in the polymer chain itself or pendant thereto. For various reasons, it is sometimes desired to eliminate this unsaturation. The olefinic unsaturation is subject to attack by oxidants, heat and/or radiation. This causes the polymer to perform poorly in applications where it is exposed to such conditions.

Thus, various methods of removing this unsaturation through hydrogenation have been devised. These methods generally involve reacting the polymer with a hydrogenating agent such as hydrogen in the presence of a metal catalyst.

One such method involves the use of a carrier-supported heterogeneous catalyst in which a metal such as nickel, platinum or palladium is supported on a carrier such as carbon, silica or alumina. Heterogeneous catalysts are often lower in activity than homogeneous catalysts and also often require higher temperature and pressure conditions in order to achieve acceptable reaction rates. The higher temperatures increase cost and can cause the polymer to decompose or the reaction system to gel. Furthermore, a larger amount of heterogeneous catalyst is usually needed on a weight basis, particularly when a high molecular weight polymer is hydrogenated. Also, heterogeneous catalysts are often not selective and can sometimes catalyze hydrogenation of other portions of the polymer, particularly aromatic rings, which may be undesirable for some applications.

Because of the problems with heterogeneous catalysts, homogeneous catalysts have been developed. Homogeneous cobalt and nickel catalysts have been used. U.S. Pat. Nos. 4,668,773, 4,716,257 and 4,801,666 disclose the use of certain lanthanide catalysts in hydrogenation reactions. In addition, certain titanium complexes have also been tried. U.S. Pat. No. 3,920,745, for example, describes the use of certain dicyclopentadienyl carbonyl acetylene titanium compounds in hydrogenating olefins and diolefins. U.S. Pat. No. 5,017,660 describes the hydrogenation of butadiene and styrene-butadiene polymers using di-p-tolylbis-(cyclopentadienyl)titanium (IV) as the catalyst. Similarly, U.S. Pat. No. 5,206,307 describes the use of various bis (cyclopentadienyl)titanium (IV) compounds to hydrogenate unsaturated polymers.

Despite the development of homogeneous catalysts, several problems remain. Many of the catalysts are colored, and must be removed from the product polymer. Others are toxic or present environmental problems. Still others do not selectively hydrogenate olefinic unsaturation, or are not sufficiently active to be used economically.

Thus, it is desirable to have a catalyst which provides reasonably facile hydrogenation under mild or moderate conditions, leaves colorless residues and which does not present environmental or disposal problems. It is further desirable that the catalyst provides for selective hydrogenation. This is particularly the case where the polymer being hydrogenated contains, in addition to the olefinic unsaturation, other sites which are also subject to hydrogenation or reduction. A prominent example of such a polymer is a copolymer of a diene such as butadiene and a vinyl aromatic such as styrene. Often it is desired to remove the residual unsaturation which is inherent in diene polymers without hydrogenating the rings of the vinyl aromatic monomers. In such instances, the catalyst desirably is highly selective for the olefinic unsaturation, yet provides for facile reaction.

SUMMARY OF THE INVENTION

This invention is a process for hydrogenating a polymer containing olefinic unsaturation, comprising reacting said polymer with a hydrogenating agent in the presence of a catalytic amount of a coordination complex containing at least one titanium, zirconium or hafnium atom having a valence from 2 to 4 and having one cyclopentadienyl or substituted cyclopentadienyl group bonded to each Ti, Zr or Hf atom.

According to this method, a facile hydrogenation of the olefinic unsaturation of a polymer is achieved under mild to moderate conditions. Moreover, the hydrogenation is selective, with aromatic groups being minimally affected in the process. Thus, the process is particularly suited for hydrogenating copolymers of conjugated dienes and vinyl aromatic monomers.

DETAILED DESCRIPTION OF THE INVENTION

In this invention, a polymer containing olefinic unsaturation is hydrogenated in the presence of a coordination complex of titanium, zirconium or hafnium. The Ti, Zr or Hf atom has a valence of from 2 to 4. Bonded to each Ti, Zr or Hf atom is a single cyclopentadienyl or substituted cyclopentadienyl group.

One group of coordination complexes useful in this invention includes those represented by structure I:

$$R_a CpM \cdot L_c \tag{I}$$

wherein Cp is a cyclopentadienyl group which may be substituted with from one to five substituents. Suitable substituents on the Cp group include hydrocarbyl, inertly substituted hydrocarbyl, silyl, germyl, cyano, amino, hydrocarbyloxy, siloxy or halo groups, or combinations thereof, said substituents each having up to about 40 non-hydrogen atoms. One or more pairs of such substituent groups may together form a ring or rings fused to the cyclopentadienyl group. In structure I, R represents an anion or dianion which is not a Cp group, and M is Ti, Zr or Hf having a valence state of from 2 to 4. L represents a neutral ligand which is coordinated with the metal atom and c is a number from about 0 to about 4. In structure I, a represents a number from about 1 to about 3, with the proviso that the absolute value of the sum of the valences of the R group or groups equals the valence of M minus one.

The Cp group is preferably cyclopentadienyl, or a substituted cyclopentadienyl group in which the substituent groups are $C_1-C_4$ alkyl, phenyl or trialkylsilyl, with methyl, ethyl, t-butyl, phenyl and trimethylsilyl being more preferred. The substituents on the cyclopentadienyl group may be the same or different from each other. In addition, the substituents may be in the form of one or more rings fused to the cyclopentadienyl group, as is the case of fluorene. Especially preferred cyclopentadienyl groups include cyclopentadienyl, methylcyclopentadienyl, trimethylsilylcyclopentadienyl, bis(trimethylsilyl)-cyclopentadienyl, methyl(trimethylsilyl)cyclopentadienyl, trimethylcyclopentadienyl, tetramethyl-cyclopentadienyl, 1-ethyl-2,3,4,5-tetramethylcyclopentadienyl, 1-phenyl-2,3, 4,5-tetramethylcyclopentadienyl, N,N-dimethylaminocyclopentadienyl, 1-N,N-dimethylamino-2, 3,4,5-tetramethylcyclopentadienyl, t-butylcyclopentadienyl, di-t-butylcyclopentadienyl, cyanocyclopentadienyl, 1-cyano-2,3,4,5-tetramethylcyclopentadienyl, indenyl, tetrahydroindenyl, tetrahydrofluorenyl, fluorenyl, octahydrofluorenyl, (1R,7S)-1,10,10-trimethyltricyclo [5.2.1.0$^{2,6}$] deca-3,5-dienyl-2-yl, (1S,9R)-9,9-dimethyltricyclo[6.1.1.0$^{2,6}$] deca-3,5-dien-2-yl, tricyclo [5.2.1.0$^{2,6}$] deca-3,5-dien-2-yl and pentamethylcyclopentadienyl groups.

Examples of the group R include hydride anion; hydrocarbyl anions such as methyl, ethyl, propyl, butyl, t-butyl, neopentyl, phenyl, benzyl, allyl, methallyl and the like; silyl anions such as trimethylsilyl, trimethylsilyl methyl, dimethylphenylsilyl methyl and the like, halides such as chloride, bromide or iodide; cyanide; alkoxides such as methoxy, ethoxy, isopropoxy, butoxy and t-butoxy, and the like; phenoxy anion; amide anions such as methyl amide, ethyl amide, t-butyl amide, pyrrolide, dimethyl amide, diethylamide, diisopropyl amide, cyclohexylamide, phenyl amide, benzyl amide and the like; phosphides such as methyl phosphide, dimethyl phosphide, cyclohexyl phosphide, t-butyl phosphide, phenyl phosphide, diphenylphosphide and the like; sulfides such a methyl sulfide and phenyl sulfide, oxy-containing anions such as perchlorate, nitrate, sulfate, methylsulfonate, trifluorosulfonate, p-toluene sulfonate, acetate, propanoate, benzoate, formate, acetylacetonate, ethanediolate, propanediolate, catechol and the like; and orthoxylyl. In addition, the group R may include dianions which form two bonds to the metal atom. R groups of this type include 1,3-propanediyl, 1,4-butanediyl and 1,5-pentanediyl groups. The group R is not a cyclopentadienyl or substituted cyclopentadienyl group. Preferably, the group R is also not a pentadienyl or substituted pentadienyl group.

M is preferably titanium or zirconium and more preferably titanium.

The L group is any neutral, inert group which forms a coordinate bond with the metal atom. By "inert", it is meant that the group does not interfere in any undesirable way with the hydrogenation reaction. In general, suitable ligands are Lewis bases which have an unshared electron pair which can complex with the titanium atom. The preferred ligands are neutral Lewis bases such as phosphines, phosphites, carbonyl, amines, alkenes, dienes and ethers. More preferred ligands are phosphines, carbonyl, dienes and amines. Especially preferred ligands are carbonyl, trimethylphosphine, triethylphosphine, dimethylphenylphosphine, butadiene, pentadiene, hexadiene, isoprene, diphenyl butadiene and pyridine. Preferably, c is from 0 to about 2, more preferably 0 to 1, most preferably 0.

Another group of suitable coordination complexes useful herein are those represented by the structure II

     (II)

wherein Cp, M, L, c and R are as defined before, X represents a dianion bonded to both metal atoms, and b represents a number from about 0 to about 2, with the proviso that the absolute value of the sum of the valences of the R group or groups equals the sum of the valences of the M atoms minus four. Examples of the dianion X include 1,2-ethanediyl, 1,3-propanediyl, 1,4-butanediyl and 1,5-pentanediyl groups.

A third group of suitable coordination complexes useful herein are those represented by the structure III:

     (III)

wherein R, α, Cp, L, c and M are as defined before, and Y is a covalent bond or a linking group connecting the two Cp groups, with the proviso that the absolute value of the sum of the valences of the R groups equals the sum of the valences of the M atoms minus two. Examples of linking group Y include silylene such as dimethyl silylene, hydrocarbylene such as methylene, and the like.

Especially preferred catalysts include (cyclopentadienyl) titanium(tris(isopropoxide)), (methylcyclopentadienyl) titanium(tris(isopropoxide)), (trimethylsilylcyclopentadienyl)titanium(tris (isopropoxide)), (bis(trimethylsilyl)cyclopentadienyl) titanium(tris(isopropoxide)), (methyltrimethylsilylcyclopentadienyl)titanium(tris (isopropoxide)), (trimethylcyclopentadienyl)titanium(tris (isopropoxide)), (tetramethylcyclopentadienyl)titanium(tris (isopropoxide)), (1-ethyl-2,3,4,5-tetramethylcyclopentadienyl)titanium (tris(isopropoxide)), (1-phenyl-2,3,4,5-tetramethyl-cyclopentadienyl)titanium (tris(isopropoxide)), (fluorenyl)titanium(tris(isopropoxide)), (pentamethylcyclopentadienyl)titanium(tris(isopropoxide)), (cyclopentadienyl)titanium(isopropoxide)(1,4-diphenylbutadiene), (pentamethylcyclopentadienyl) titaniumtrichloride, (pentamethylcyclopentadienyl) titanium dichloride, (cyclopentadienyl)titanium tribromide, (cyclopentadienyl)titanium dichloride, (tricyclo[5.2.1.0$^{2,6}$] deca-3,5-dien-2-yl)titanium trichloride, (cyclopentadienyl) titaniumtriphenyl, (cyclopentadienyl)titanium trimethyl, (pentamethylcyclopentadienyl)titanium bis(allyl), (cyclopentadienyl)titanium bis(allyl), cyclopentadienyl titanium tris(dimethylamide), (cyclopentadienyl) titanium tris (acetate), and the corresponding zirconium complexes.

Numerous methods are known in the art for preparing the catalysts used in this invention. For example, the catalysts can be prepared by contacting the corresponding R$_α$ MZ compound, wherein Z is a leaving group, with a cyclopentadienyl anion in the presence of an inert solvent such as tetrahydrofuran. The cyclopentadienyl anion is advantageously used in the form of a salt, particularly an alkali metal or alkaline earth metal salt. The R$_α$ MZ compound may be coordinated with a Lewis base. Alternatively, the ligand L may be present as a reagent in the reaction mixture. Such syntheses are described, for example in Bull. Acad. Sci. USSR Div. Chem. Sci. 1968, 514, incorporated herein by reference. Another method for preparing the catalyst involves an R-R* exchange, wherein a CpMR'* compound, in which R*' is a leaving group, is contacted with a source of R anions, such as RH or RLi, to exchange the R group for the leaving group R*', as described for example in Bull. Chem. Soc. Japan 1975, 48, 2460, incorporated herein by reference. Other methods for preparing the catalyst are described in Chem. Rev. 1991, 91, 509–551, incorporated herein by reference. These reactions generally proceed well at or below room temperature, but elevated temperatures are often preferred.

The catalyst can be recovered from the reaction mixture by extraction with a solvent such as pentane or toluene and then stripping off the solvent.

If desired, the catalyst may be treated with an alkyl metal complex prior to the commencement of the hydrogenation reaction. Suitable such alkyl metal complexes include those represented by the structures R"-Na, R"-Li, R"$_2$Mg, R"$_3$Al, R"MgW, where W is a halogen and the like, wherein R" is an alkyl group having from one to ten, preferably from 1–4 carbon atoms. The catalyst is advantageously treated with the alkyl metal complex at room temperature for a short period. This may be done in the presence of the polymer to be hydrogenated, or prior to contacting with the polymer to be hydrogenated. The hydrogenating agent is introduced into the system prior to, during or after this step.

The polymer to be hydrogenated in this process is characterized by having olefinic unsaturation either within the polymer chain, pendant to it, or both. Of particular interest are polymers of one or more conjugated dienes such as butadiene, isoprene, 2,3-dimethylbutadiene, 1,3-pentadiene, 2-methylpentadiene and 1,3-hexadiene, as these typically contain large numbers of olefinically unsaturated sites in the polymer chain, pendant to it, or both. Among these polymers, polymers of butadiene and isoprene, and especially polymers of butadiene, are preferred on the basis of cost, availability, and beneficial properties.

Copolymers of one or more conjugated dienes and one or more other monomers are also suitable for use in this invention. The nature of the copolymerized monomer is generally not important, provided that any functional group which may be present is not undesirably affected by and does not interfere with the hydrogenation reaction. These include, for example, alkenes such as ethylene, propylene, 1-butene, 1-hexene, 1-octene and the like; vinyl chloride, vinylidene chloride, and the like. Of particular interest, however, are copolymers of one or more conjugated dienes and one or more vinyl aromatic monomers such as styrene, α-methyl styrene, vinyl naphthalene, o-methyl styrene, p-methyl styrene, p-ethyl styrene, divinylbenzene and the like. Of these vinyl aromatic monomers, styrene is most preferred.

The copolymer of the conjugated diene may be of any type, such as a random, block, tapered block, or graft copolymer. Block copolymers are preferred, particularly AB-type diblock or ABA-type triblock copolymers, wherein A represents a poly(vinyl aromatic) block and B represents a poly(diene) block. In these block copolymers, it is preferred that the poly(diene) portion constitutes about 10 to about 99, more preferably about 25 to about 85% of the total weight of the polymer. Most preferred are block copolymers of butadiene and styrene of the AB or ABA type.

The process of this invention is also applicable to the so-called living polymers of conjugated dienes which contain terminal metal atoms. These polymers may be reacted with hydrogen to remove the terminal metal atoms. This step may be done in conjunction with the hydrogenation of this invention. This may be achieved by contacting hydrogen, the catalyst and the metal-terminated polymer in any order, thereby hydrogenating the polymer and removing the terminal metal atom.

The molecular weight of the polymer is not critical, and is mainly determined according to the properties required in the particular applications in which the hydrogenated polymer will be used. However, since it is preferred to conduct the hydrogenation in the liquid phase, the polymer is preferably molten or dissolved in some solvent in which the hydrogenation can be conducted. Thus, a number average molecular weight of from less than 1000 to 5,000,000 or more is suitable. If the polymer is crosslinked, it is preferably swellable in a solvent in which the hydrogenation can be conducted.

The hydrogenation is conducted by contacting the polymer with a hydrogenating agent in the presence of the catalyst described before. The hydrogenating agent can be any material which provides hydrogen to the reaction, but hydrogen gas is highly preferred because it is inexpensive and easy to use. Using hydrogen gas as the hydrogenating agent, the reaction is advantageously conducted by contacting the polymer and catalyst with the hydrogen gas at an elevated pressure. Suitable hydrogen partial pressures are in the range from about 20 to about 5000 psig, preferably from about 100 to about 2000 psig, more preferably from about 100 to about 400 psig.

The hydrogenation reaction may be conducted at any temperature at which an adequate reaction rate is achieved. Generally, however, an elevated temperature is used, since the reaction normally proceeds slowly at room temperature. On the other hand, the use of the catalyst described herein allows for an acceptable reaction rate at mild to moderate temperatures. Thus, a temperature in the range from about 25° to about 100° C. is suitable, and a preferred temperature range is from about 40° to about 75° C.

The amount of catalyst is chosen to provide an acceptable reaction rate. Typically, about 1 part by weight catalyst is used per 10 to 50,000, preferably 50 to 5000 parts per weight of the polymer. Higher amounts of catalyst tend to increase the reaction rate. The hydrogenating agent is normally used in large stoichiometric excess, particularly if hydrogen is used.

It is preferred to conduct the hydrogenation homogeneously with the polymer in a liquid state. Accordingly, unless the polymer is a liquid at room temperature or at a slightly elevated temperature (up to about 75° C.), it is preferred to conduct the hydrogenation in an inert solvent in which the catalyst is dissolved and the polymer is dissolved or swollen. Any solvent which dissolves the polymer and which does not engage in any undesirable side reactions with the reagents present in the hydrogenation reaction can be used. Suitable such solvents include aliphatic hydrocarbons such as n-pentane, n-hexane, n-heptane, n-octane, isooctane, and the like; alicyclic hydrocarbons such as cyclohexane, methylcyclohexane, cycloheptane, and the like; and aromatic solvents such as toluene, xylene, ethylbenzene and benzene. The solvent is ordinarily used in an amount sufficient to dissolve the polymer, and to bring the viscosity of the resulting solution down to a workable range.

The hydrogenating agent, polymer and catalyst are contacted under conditions such that thorough contact of the hydrogenating agent with the polymer is achieved. When hydrogen is used, this is readily achieved by adding hydrogen gas to a mixture of the organic polymer and the catalyst with sufficient agitation to disperse hydrogen gas bubbles through the polymer. Contact times depend somewhat on the degree of hydrogenation desired; however, from about 15 minutes to about 24 hours, preferably about 1 to about 8 hours is ordinarily sufficient.

Following the hydrogenation reaction, the hydrogenated polymer can be recovered from the solvent if any is used. The hydrogenated polymer may be caused to precipitate out of the solvent by the addition of a polar solvent such as acetone or an alcohol. Alternatively, the solvent may be distilled off, or hot water may be added and a water-solvent azeotrope distilled off. The hydrogenated polymer may be cleaned up to remove residual catalyst or other impurities, but since the catalyst typically is used in small amounts, such is not usually necessary.

The following examples are provided to illustrate the invention, but are not intended to limit the scope thereof. All parts and percentages are by weight unless otherwise indicated.

Example 1

A. Preparation of (1-ethyl-2,3,4,5-tetramethylcyclopentadienyl) titanium(tris(isopropoxide))

A solution of 1.544 g (8.96 mmol) sodium 1-ethyl-2,3,4,5-tetramethylcyclopentadienide and 2.095 g (8.04 mmol) chlorotitanium(tris(isopropoxide)) are heated to reflux in 170 mL tetrahydrofuran (THF) for several hours. The THF is removed under reduced pressure, and the residue extracted with pentane and filtered. The pentane was then vacuum stripped to provide 2.45 g of a oily brown product which partially solidified on standing. Proton NMR shows the product to be (1-ethyl-2,3,4,5-tetramethylcyclopentadienyl) titanium(tris(isopropoxide)).

B. Hydrogenation of styrene-butadiene copolymer using (1-ethyl-2,3,4,5-tetramethylcyclopentadienyl)titanium (tris (isopropoxide))

A 2-liter pressure reactor is cleaned, evacuated, and repressurized with nitrogen. To the reactor are added 1350 mL dry cyclohexane, 143 g 1,3-butadiene are added and 67.6 mL styrene. The temperature is raised to 40° C., and 1.4 mL of a 0.483M solution of N,N,N',N",N"-pentamethyldiethylene triamine and 26.0 g (2.27 mmol) of 1,3-bis-(1-lithio-3-methyl-1-phenylpentyl) benzene are added. The temperature is then raised to 45° C. for 30 minutes, to form a stock "living polymer" having terminal lithium atoms.

A portion of the stock living polymer is treated with 3.0 mL of 10 vol. % methanol in toluene to remove the terminal lithium atoms. The resulting polymer solution is degassed under partial vacuum and passed though a column of activated 4ÅÂ molecular sieves to remove residual methanol. The resulting solution has a solids content of 17.7% (wt./vol.)

A 300 mL Parr reactor is charged with 50 mL of this polymer solution, along with 50 mL toluene, 0.057 g (1-ethyl-2,3,4,5-tetramethylcyclopentadienyl)titanium (tris (isopropoxide)) and 0.17 mL of 2.4M n-butyl lithium. The reaction is pressurized with hydrogen to 100 psig, then heated to 50° C. Additional hydrogen is added to the reactor whenever the pressure drops below 80 psig. After three hours, the reaction is terminated, with 26 mmol of hydrogen having been added to the reactor.

In an alternative hydrogenation process, the removal of terminal lithium atoms is effected simultaneously with the hydrogenation. In a 300 mL Parr reactor is charged 52.5 g of the stock living polymer, 50 mL cyclohexane, 0.020 g (1-ethyl-2,3,4, 5-tetra-methylcyclopentadienyl)titanium (tris (isopropoxide)) and 0.17 mL of 2.4M n-butyl lithium. The reactor is pressurized with hydrogen to 100 psi, then heated to 50° C. In a four-hour hydrogenation, 24 mmol hydrogen is consumed.

Example 2

Into a 1000 mL pressure reactor are added 500 mL dry cyclohexane and 50 g dry 1,3-butadiene. The resulting solution is heated to 50° C., and polymerization initiated by the addition of 0.9 mL of a 0.567M sec-butyl lithium solution in cyclohexane. After two hours, the polymerization is terminated by adding 150 psi hydrogen to the reactor. The reaction mixture is stirred under the hydrogen atmosphere for 30 minutes, at which time the hydrogen is vented. The resulting polymer contains 8.3% 1,2-diene groups, as shown by proton NMR.

To the polymer are added 20 mL of a 0.0167M solution of (pentamethylcyclopentadienyl) (tribenzyl) titanium in toluene. The reactor is pressurized to 300 psi with hydrogen, and heated to 55° C. The reaction is continued for 24 hours and 40 minutes, with hydrogen pressure being periodically readjusted to 300 psi. The reaction is then terminated by venting the excess hydrogen. Proton NMR shows that 71% of the olefinic unsaturation has been removed.

Example 3

A. Preparation of (tetramethylcyclopentadienyl) titanium ((tris(isopropoxide)).

A solution of 3.000 g sodium tetramethylcyclopentadienide and 4.929 g chlorotitanium tris(isopropoxide) in approximately 70 mL tetrahydrofuran are refluxed for three days. The solvent is stripped and the residue extracted with pentane and filtered. The pentane is removed under vacuum to provide a brown, semi-solid product. Proton NMR shows the product to be (tetramethylcyclopentadienyl) titanium ((tris(isopropoxide)).

B. Hydrogenation of polybutadiene using (tetramethylcyclopentadienyl) titanium ((tris(isopropoxide))

Into a clean, dry 1000 mL pressure reactor are added a solution of 10 g of polybutadiene having an Mn of 78,000 and a 38% 1,2-diene content in 500 mL dry cyclohexane. The solution is then deoxygenated.

In a separate container, 7.4 mL of a 0.1M (tetramethylcyclopentadienyl) titanium ((tris(isopropoxide)) solution in cyclohexane is treated with 6.4 mL of a 0.55M sec-butyl lithium solution in cyclohexane, by mixing the materials at room temperature in the absence of air. The resulting catalyst solution is then transferred to the pressure reactor containing the polybutadiene solution. The reactor is purged twice with 300 psig hydrogen, and then pressurized to 300 psig with hydrogen. The reaction solution is then heated to 55° C., and held there for about 4 hours, with hydrogen pressure being periodically readjusted to 300 psi. The reaction is then terminated by venting the excess hydrogen. Proton NMR shows that 57% of the olefinic unsaturation has been removed.

Example 4

Into a 1000 mL pressure reactor are added 500 mL dry cyclohexane and 50 g dry 1,3-butadiene. The resulting solution is heated to 50° C., and polymerization initiated by the addition of 0.9 mL of a 0.567M sec-butyl lithium solution in cyclohexane. After two hours, the polymerization is terminated by adding 150 psig hydrogen to the reactor. The reaction mixture is stirred under the hydrogen atmosphere for 30 minutes, at which time the hydrogen is vented.

In a separate container, 18.5 mL of a 0.05M (cyclopentadienyl) titanium ((trichloride) solution in cyclohexane is treated with 6.8 mL of a 0.54M sec-butyl lithium solution in cyclohexane, by mixing the materials at room temperature in the absence of air. The resulting catalyst solution is then transferred to the pressure reactor containing the polybutadiene solution, and the reaction vessel is then pressurized to 300 psig with hydrogen. The reaction solution is then heated to 55° C., and held there for about 24 hours, with hydrogen pressure being periodically readjusted to 300 psig. The reaction is then terminated by venting the excess hydrogen. Proton NMR shows that 66% of the olefinic unsaturation has been removed from the polybutadiene.

What is claimed is:

1. A process for hydrogenating a polymer containing olefinic unsaturation, which polymer is a polymer of a conjugated diene, comprising contacting said polymer under hydrogenation conditions with a hydrogenating agent in the presence of a catalytic amount of a coordination complex containing at least one titanium, zirconium or hafnium atom having a valence from 2 to 4 and having one cyclopentadienyl or substituted cyclopentadienyl group bonded to each Ti, Zr or Hf atom, wherein the coordination complex is represented by the structure $$R_\alpha CpM \cdot L_c$$

wherein Cp is a cyclopentadienyl group or a substituted cyclopentadienyl group with from one to five substituents selected from the group consisting of hydrocarbyl, silyl, germyl, cyano, amino, hydrocarbyloxy, siloxy or halo groups, and combinations thereof, said substituents each having up to about 40 nonhydrogen atoms, and wherein one or more pairs of such substituent groups may together form a ring or rings fused to the cyclopentadienyl group, R represents an anion or dianion which is not a Cp group, M is Ti, Zr or Hf having a valence state of from 2 to 4, L represents a neutral ligand which is coordinated with the metal atom, c is a number from about 0 to about 4, and α represents a number from about 1 to about 3, with the proviso that the absolute value of the sum of the valences of the R group or groups equals the valence of M minus one.

2. The process of claim 1 wherein M is titanium Or zirconium.

3. The process of claim 2 wherein R is not a pentadienyl or substituted pentadienyl group.

4. The process of claim 3 wherein said polymer of a conjugated diene is a polymer of butadiene.

5. The process of claim 4 wherein the Cp group is cyclopentadienyl group substituted with one or more methyl, ethyl, t-butyl, phenyl or trimethylsilyl groups, or a combination thereof.

6. The process of claim 4 wherein a is 3.

7. The process of claim 4 wherein L is carbonyl, a phosphine or an amine.

8. The process of claim 4 wherein said polymer is a copolymer of a butadiene and styrene.

9. A process for hydrogenating a polymer containing olefinic unsaturation, which polymer is a polymer of a conjugated diene, comprising contacting said polymer under hydrogenation conditions with a hydrogenating agent in the presence of a catalytic amount of a coordination complex containing at least one titanium, zirconium or hafnium atom having a valence from 2 to 4 and having one cyclopentadienyl or substituted cyclopentadienyl group bonded to each Ti, Zr or Hf atom, wherein said coordination complex is represented by the structure:

$$R_\alpha MCp - Y - CpMR_\alpha \cdot L_c$$

wherein Cp is a cyclopentadienyl group or a substituted cyclopentadienyl group with from one to five substituents selected from the group consisting of hydrocarbyl, silyl, germyl, cyano, amino, hydrocarbyloxy, siloxy or halo groups, and combinations thereof, said substituents each having up to about 40 nonhydrogen atoms, and wherein one or more pairs of such substituent groups may together form a ring or rings fused to the cyclopentadienyl group, R represents an anion or dianion which is not a Cp group, M is Ti, Zr or Hf having a valence state of from 2 to 4, L represents a neutral ligand which is coordinated with the metal atom, c is a number from about 0 to about 4, and α represents a number from about 1 to about 3, with the proviso that the absolute value of the sum of the valences of the R group or groups equals the valences of the M atoms minus two, and Y is a covalent bond or a linking group connecting the two Cp groups.

10. A process for hydrogenating a polymer containing olefinic unsaturation, which polymer is a polymer of a conjugated diene, comprising contacting said polymer under hydrogenation conditions with a hydrogenating agent in the presence of a catalytic amount of a coordination complex containing at least one titanium, zirconium or hafnium atom having a valence from 2 to 4 and having one cyclopentadienyl or substituted cyclopentadienyl group bonded to each Ti, Zr or Hf atom, wherein said coordination complex is represented by the structure:

$$R_b CpMXMCpR_b \cdot L_c$$

wherein Cp is a cyclopentadienyl group or a substituted cyclopentadienyl group with from one to five substituents selected from the group consisting of hydrocarbyl, silyl, germyl, cyano, amino, hydrocarbyloxy, siloxy or halo groups, and combinations thereof, said substituents each having up to about 40 nonhydrogen atoms, and wherein one or more pairs of such substituent groups may together form a ring or rings fused to the cyclopentadienyl group, R represents an anion or dianion which is not a Cp group, M is Ti, Zr or Hf having a valence state of from 2 to 4, L represents a neutral ligand which is coordinated with the metal atom, X represents a dianion bonded to both metal atoms and b represents a number from about 0 to about 2, with the proviso that the absolute value of the sum of the valences of the R group or groups equals the sum of the valences of the M atoms minus 4.

* * * * *